United States Patent
Baek et al.

(10) Patent No.: US 6,193,900 B1
(45) Date of Patent: Feb. 27, 2001

(54) METHOD FOR SENSING ETCH OF DISTRIBUTED BRAGG REFLECTOR IN REAL TIME

(75) Inventors: Jong Hyeob Baek; Bun Lee, both of Daejon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 0 days.

(21) Appl. No.: 09/143,484

(22) Filed: Aug. 28, 1998

(30) Foreign Application Priority Data

Nov. 29, 1997 (KR) .................................................. 97-64811

(51) Int. Cl.$^7$ .............................. B24B 49/00; G01B 11/00
(52) U.S. Cl. ................................................. 216/85; 216/94
(58) Field of Search ......................................... 216/85, 94

(56) References Cited

U.S. PATENT DOCUMENTS

| | | | |
|---|---|---|---|
| 5,392,124 | * 2/1995 | Barbee et al. | 356/381 |
| 5,468,656 | * 11/1995 | Shieh et al. | 437/23 |
| 5,582,746 | 12/1996 | Barbee et al. | 216/86 |
| 5,658,418 | 8/1997 | Coronel et al. | 156/345 |

FOREIGN PATENT DOCUMENTS

| | | | |
|---|---|---|---|
| 57-89474 | * 6/1982 | (JP) | C23F/1/00 |
| 59-74635 | * 4/1984 | (JP) | H01L/21/306 |

\* cited by examiner

*Primary Examiner*—Randy Gulakowski
*Assistant Examiner*—Shamim Ahmed
(74) *Attorney, Agent, or Firm*—Cohen, Pontani, Lieberman & Pavane

(57) ABSTRACT

A method for sensing the etch of distributed Bragg reflector (called DBR below) in a real time is provided. More particularly, a method for searching informations of etch speed and etch stop step by monitoring the etching procedure in the wet etching method which is a post-process in the semiconductor device manufacturing process. A laser beam is irradiated on the sample sunk in the etching solution during the etching process is on the way. Then, computer measures the intensity of laser beam reflected on the sample, analyzes the periodic signals occurred by its interference and obtains the etching speed of the sample in a real time. The laser provides thermal energy on the sample during wet etching and occurs irregular etching speed on a beam contacting part of sample and non contacting part. Uniform etching speed can be obtained in the entire sample using a convex lens having a suitable focal distance.

1 Claim, 3 Drawing Sheets

METHOD FOR SENSING ETCH OF DISTRIBUTED BRAGG REFLECTOR IN REAL TIME

BACKGROUND OF THE INVENTION

1. Field of the Invention

This invention relates to a method for sensing etch of distributed Bragg reflector (called DBR below) in a real time, more particularly, relates to a method for searching informations about etch speed and etch stop step by monitoring etching procedure in a wet etching method which is a post-process in the semiconductor device manufacturing process. The invention can be applied to the etching method among various post-process steps after growing thin film in the compound semiconductor device manufacturing procedure, both wet etching and dry etching methods.

2. Description of the Related Art

In the conventional art, the etching time was obtained using the data of the thickness of sample etched and the etching speed measured by etch solution in the wet etching process. However, it needed much time and labor to make database for them since there are many samples and various etch solutions can be used according to samples.

Accordingly, the real time growth measurement method can be applied to the wet etch method, which is well known in the thin film growth step which is pre-process stage in the semiconductor device manufacturing process. In the real time growing measurement method, the growing speed of thin film is controlled by analyzing the periodic shapes of intensity of reflected laser beam which is due to its interference of reflection according to the growing thickness during the films having different indices of refraction are growing on the substrate. If applying this to the wet etching method, the intensity of laser beam reflected according to the thickness of thin film which is disappeared by the etching will have periodic shape by the interference. The invention provides a method of recognizing the etching speed regardless of the etching solution by using this principle.

The thin film is grown through the medium of gas under vacuum condition or in the atmospheric pressure so that there is no limitation in the selection of laser beam. However, the laser should be selected in the wet etching process since the laser must pass through the medium of etching solution and most solutions have some characteristic to shut off special wavelengths. Moreover, there is another problem that the etching speed of region on which laser beam is irradiated is different from that of region on which laser beam is not irradiated.

SUMMARY OF THE INVENTION

In view of such aspect, the object of the present invention is to provide the informations about etching speed and etching stop step in a real time by monitoring the etching procedures in the wet etching process of semiconductor device manufacturing process.

A method for sensing the Bragg reflector etching in a real time is provided in accordance with the invention, which method comprises the steps of irradiating laser beam on the sample sunk in the etching solution after distributing it using a convex lens, so that the entire surface of sample can be covered by the distributed laser beam; detecting the laser beam reflected on the sample through another convex lens using a detector; and analyzing the periodic signals of the detected laser beam in the detector sensing the etching speed in a real time through computer connected to the detector.

BRIEF DESCRIPTION OF THE DRAWINGS

The above object, and other features and advantages of the present invention will become more apparent by describing the preferred embodiment thereof with reference to the accompanying drawings, in which.

similar reference characters refer to similar parts in the several views of the drawings.

DESCRIPTION OF THE PREFERRED EMBODIMENT

Figure 1:
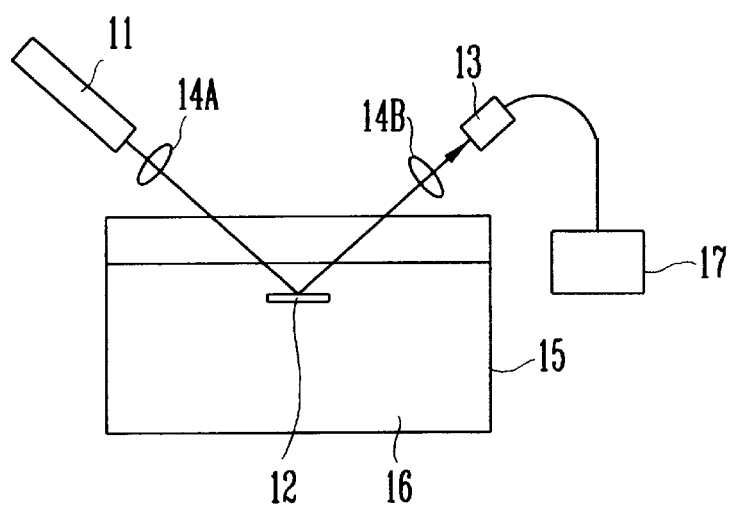
FIG. 1 shows a structural view of a real time reflection index measurement apparatus in accordance with the invention.

As shown in FIG. 1, a helium neon laser 11 is irradiated into the sample 12 and the laser beam reflected from the sample 12 reaches detector 13. Since the etching solution has very high absorption ratio in the long wavelengths over the infrared ray region, it is not easy to detect the reflected laser beam. Therefore, the laser having wavelengths of visible ray region is suitable for this application. The lasers having wavelength of visible ray region are argon laser and helium neon laser.

Argon laser is not suitable for constructing a simple apparatus such as this invention since it has large size and costs much even though it has high power. Then, the helium neon laser 11 has a power enough to be detected by the detector and is not expensive. Therefore, the helium neon laser 11 is used for this application. The outer diameter of laser beam is dispersed through the convex lens 14A and is incident upon the sample, and the reflected beam is collected through another convex lens 14B in the opposite site. The sample 12 is sunk in the dewer 15 containing etching solution 16 and the intensity of laser beam which was reflected to the detector 13 is displayed on the monitor connected to the computer 17.

Figure 2:
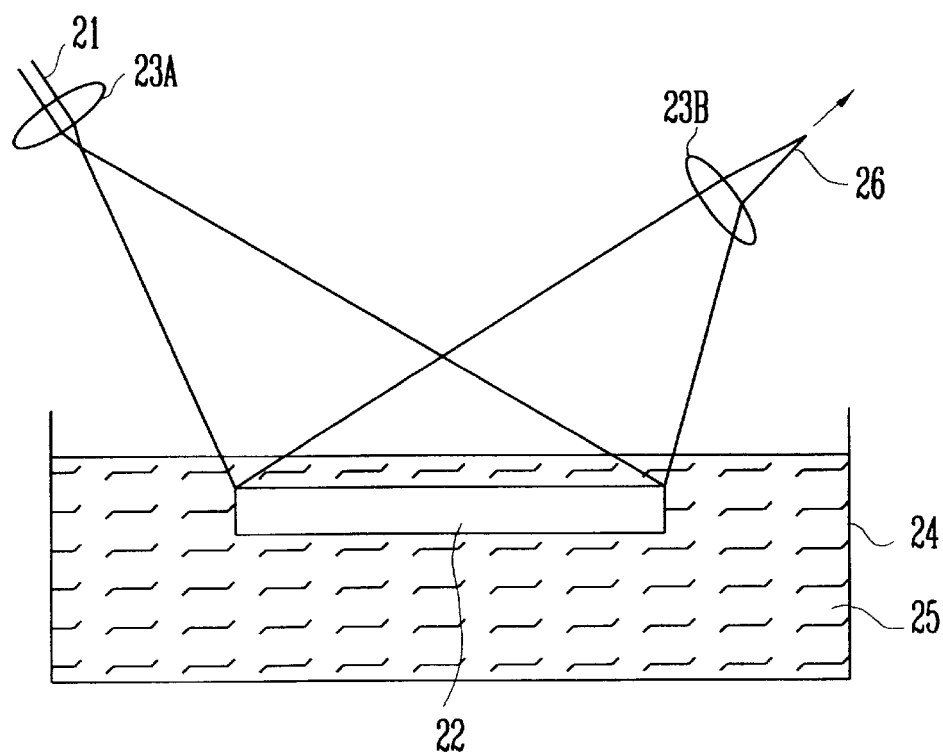
FIG. 2 shows a magnified structural view in which the laser beam is irradiated on the sample.

FIG. 2 shows a magnified structural view in which the laser beam is irradiated on the sample. The reason why laser beam 21 should be dispersed is as follows. If the original laser beam is irradiated on the sample, the surface of sample 22 becomes irregular one since the etching speed of the laser beam contacting part is higher than that of laser beam non contacting part. Accordingly, the uniform etching speed can be obtained if the laser beam is dispersed on the entire surface of sample 22. The convex lens 23A has a suitable focal distance in order that the diameter of dispersed laser beam covers all the surface of sample 22. The sample 22 is sunk in the dewer 24 containing etching solution 25 and the intensity of beam 21 reflected into the detector 26 is displayed on the monitor connected to the computer. Since the reflected laser beam 21 has a dispersed shape and the detector is smaller than dispersed shape, the reflected beam should be controlled to be focused on the detector using the convex lens 23B having a suitable focal distance. By doing this, the maximum efficiency of detector 26 can be obtained.

Figure 3A:
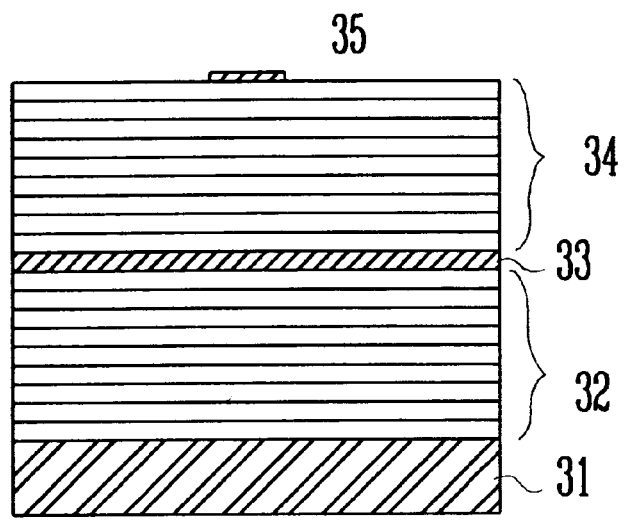
FIGS. 3a and 3b are cross sectional views showing the shapes of sample before and after etching.
Figure 3B:
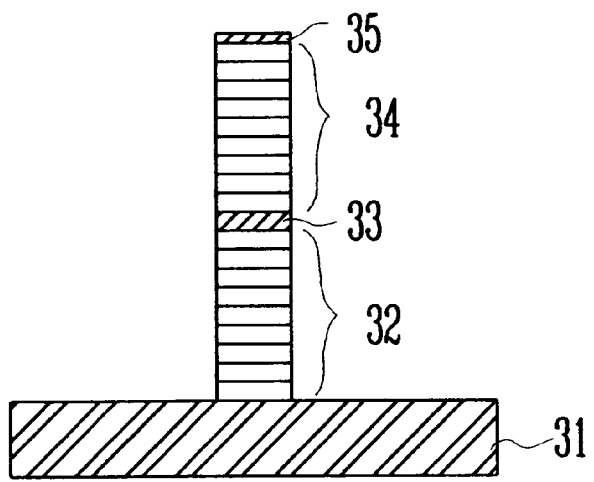

FIGS. 3a and 3b are cross sectional views showing the shapes of sample before and after etching. If a sample shown in FIG. 3a is sunk in a etching solution, a part of sample not protected by mask 35 is etched until the substrate 31 of sample is exposed as shown in FIG. 3b. The figures did not consider real sizes of sample and mask. That is, real outer size of sample is about 1 cm and real outer size of mask is 10 μm so, the area of mask is one the ten thousandths of that of sample and it is determined that no laser beam is covered by mask.

The etched Bragg reflectors (top DBR, bottom DBR) 32, 34 are used to manufacture surface emitting semiconductor laser and have an active layer 33 therebetween.

Vertical cavity surface emitting laser is a device which emits laser beam from the surface of semiconductor substrate 31. The active layer 33 of the laser generates optical energy when current flows through the electrodes formed under the substrate and on the grown thin film, and the optical energy is reflected on both Bragg DBRs 32, 34 grown above and below the active layer and oscillates repeatedly. The optical energy which gains high energy by resonance during it passes the path repeatedly changes to laser beam consequently and passes through one of Bragg reflectors 32, 34 whose reflection index is designed to be lower. Here, a laser of pillar shape including Bragg reflectors is isolated from the other part. What the laser is isolated means the electrical isolation procedure. There are two methods to isolate the laser from other part, that is, one is to destroy the atomic scale of area except desired area and the other is to remove all area except desired area. This invention uses wet etching method in the latter method. However, dry etching method can also be applied to application of the invention. As a reference, the dry etching method uses etching gases, for example, fluorine (F) or chlorine (Cl) and applies the principle in which the gases combine with atoms of thin film, react on them and etch the thin film. The wet etching method splits the atoms of thin film using acid or alkali solution. Since the thin film part remained after etching process as shown in FIG. 3b is isolated electrically from the other part, the device is ready to operate if electrodes are attached for flowing current into the device.

Figure 4:
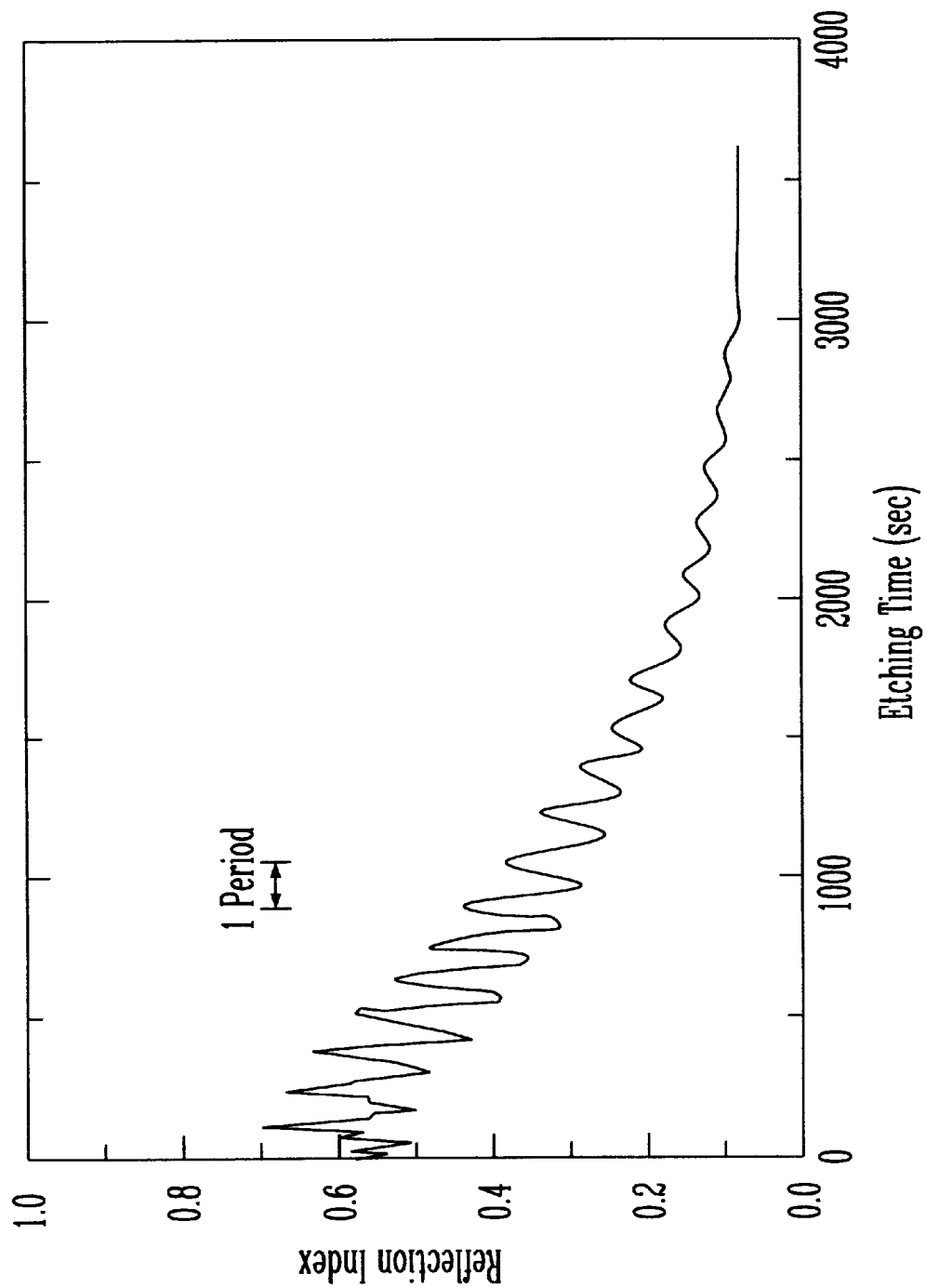
FIG. 4 is a graphical view showing the intensities of laser beam input into the detector during etching procedure.

FIG. 4 is a graphical view showing the intensities of laser beam input into the detector during etching procedure in accordance with time.

The reason why the reflected laser beam shows periodic signals is that the maximum and minimum signals are shown up periodically by the interference between the beam reflected on the surface of thin film and the beam reflected on the substrate after penetrating the thin film in the case that the thickness of thin film becomes thin as the thin film is etched. The etching speed can be obtained at once using the period since period is a factor which relates to the etching speed. Here, if the period of reflected signal occurred periodically is T and the measured wavelength of laser is $\lambda$, an equation $T=\lambda/(2nG)$ can be obtained. Here, n represents an effective index of refraction of growing thin film and G represents etching speed of thin film. The Bragg reflector is a structure which has many thin film pairs grown, each pair having two different thin films. The reason why intensity of reflection vibrates is that whenever one pair of Bragg reflector is etched the intensity has the maximum and minimum values due to the interference occurred by the difference of index of refraction. That is, one cycle change of the intensity of reflection index corresponds to one pair of Bragg reflector. In order to etch desired pairs of the Bragg reflector, the etching process can be stopped after the same number of cycle is detected during searching the reflection index cycle.

Since etching speed of Bragg reflector can be obtained in a real time during the Bragg structure grown is etched in accordance with the invention, the detailed processes for measurement of etching speed in advance are not needed and therefore the costs and efforts for the procedures can be saved. By observing the change of reflected beam in the etching process according to real time laser measurement method, the etching procedure of complex thin film structure can be displayed on the computer and the informations about etching stop time can also be obtained simultaneously.

What is claimed is:

1. A method for sensing etch of a Bragg reflector in real time, comprising the step of:

irradiating a laser beam on a sample Bragg reflector in an etching solution after dispersing the laser beam using a convex lens, so that the entire surface of the sample Bragg reflector can be covered by the dispersed laser beam;

detecting the laser beam reflected from the sample through another convex lens using a detector; and analyzing periodic interference signals of the detected laser beam in the detector by sensing the etching speed in real time through a computer connected to the detector;

wherein one periodic interference signal of the detected laser beam corresponds to one pair of Bragg reflectors which includes many pairs of thin films.

* * * * *